United States Patent [19]

Schroeder

[11] 4,183,600
[45] Jan. 15, 1980

[54] ELECTROLYTIC CAPACITOR COVER-TERMINAL ASSEMBLY

[75] Inventor: Walter W. Schroeder, Williamstown, Mass.

[73] Assignee: Sprague Electric Company, North Adams, Mass.

[21] Appl. No.: 950,186

[22] Filed: Oct. 10, 1978

[51] Int. Cl.² ............................................. H01G 9/10
[52] U.S. Cl. .................................. 339/218 R; 264/272; 361/433
[58] Field of Search ............... 264/271, 272; 361/433; 339/218 R, 218 M, 176 R; 174/50.5

[56] References Cited

U.S. PATENT DOCUMENTS

| 2,000,793 | 5/1935 | Sprague et al. | 361/433 |
| 2,958,101 | 11/1960 | Guggenheim et al. | 264/272 X |
| 3,398,333 | 8/1968 | Zeppieri | 361/433 |
| 3,686,538 | 8/1972 | Webster | 361/433 |
| 3,866,095 | 2/1975 | Marmorek | 361/433 |

*Primary Examiner*—Eugene F. Desmond
*Attorney, Agent, or Firm*—Connolly and Hutz

[57] ABSTRACT

A cover-terminal assembly for an electrolytic capacitor is made by placing a gasketed terminal in a counterbored hole in a polyphenylene sulfide cover and upsetting the shank of the terminal by resistance heating under pressure. The portion of the hole adjacent the opposite end of the terminal is also counterbored and then filled in by molten cover material flowed during the hot upsetting operation.

7 Claims, 3 Drawing Figures

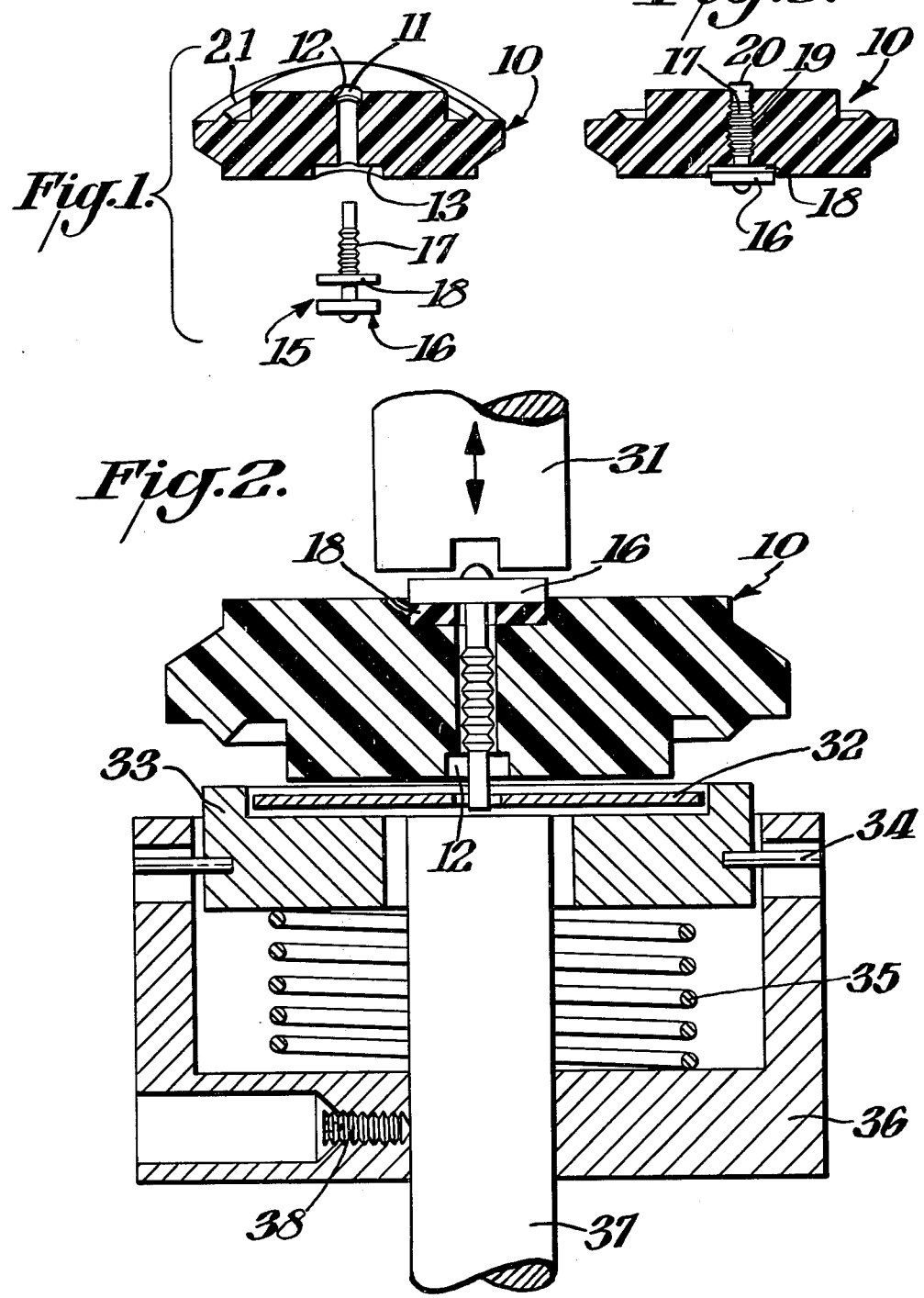

ELECTROLYTIC CAPACITOR COVER-TERMINAL ASSEMBLY

BACKGROUND OF THE INVENTION

This invention relates to a cover-terminal assembly for an electrolytic capacitor. More particularly, it relates to an assembly with improved weight-loss characteristics.

Electrolytic capacitors that are designed for operation at 85° C.–125° C. or higher frequently employ dimethylformamide as electrolyte solvent. Its high solvency requires the use of chemically-inert materials for covers and gaskets. Polypropylene and other low softening temperature plastics have been used to make such covers. Such materials are described by Zeppieri in U.S. Pat. No. 3,398,333, issued Aug. 20, 1968, and are chemically-resistant and resilient enough to permit bonding of the terminal to the cover by an upset operation. However, some of these materials, and particularly polypropylene, suffer weight loss on temperature cycling due to relaxation of the polypropylene at elevated temperatures. Desirable properties for a cover material include the absence of volatile or degradable constituents so as to insure low or no weight loss on temperature cycling, chemical resistance to high solvency electrolyte solvents, ease of manufacture by conventional processes such as molding, and ease of bonding to terminals and capacitor containers to provide a leak-proof unit.

SUMMARY OF THE INVENTION

One material which meets most of the above criteria is Ryton, a polyphenylene sulfide polymer manufactured by Phillips Petroleum Co. As this polymer is a thermoplastic, it can be molded to the desired shape, and it is compatible with conventional electrolytic capacitor solvents including dimethylformamide. It has little if any weight loss on temperature cycling and does not soften below 150° C. which contributes to leakage. However, it is a tough material with a high softening temperature. A terminal can not be locked satisfactorily to it by a simple mechanical upsetting operation; indeed, only the external portion of the terminal is enlarged. When terminals are molded in place in a polyphenylene sulfide cover, leakage develops on temperature cycling because of the difference in the coefficients of expansion for Ryton and the terminal metal, usually aluminum.

It has now been found that if an aluminum feed-through terminal is inserted in the cover and hot upset by resistance heating while confined under pressure, it is possible to swell the mid-portion of the terminal shank instead of the end. At the same time, the plastic around it is heated and flows. Since it is thermoplastic, on cooling and solidification it forms a tight seal. However, if the end of the terminal inside the capacitor does not completely seal to the cover, a small amount of electrolyte could seep around it and be pumped along the terminal on each temperature cycle. When it reaches the outside of the case, the electrolyte solute may crystallize, and, while this deposit frequently acts as a seal to prevent further leakage, it is not a reliable answer to the problem and is unsightly. By enlarging one end of the hole to form a seat for a gasket, a gasket of equal to or of larger outside diameter than the terminal can be used to prevent such electrolyte seepage.

Because of the higher heat distortion temperature of polyphenylene sulfide, a cover made of it does not yield as readily as prior art materials during hot upsetting. Because aluminum, the preferred terminal material, has a narrow plastic zone (approximately 550°–600° C.), it is preferable to perform the hot upsetting under pressure e.g., 75 psi, while confining the insert so that the plastic adjacent the terminal and melted during the resistance heating is displaced and flows around the terminal and into a small counterbore which acts as a reservoir for excess molten plastic. If the terminal is overheated, e.g., above 600° C., it melts; if underheated, only the external ends of the terminal will swell as the plastic will not be soft enough to allow expansion of the shaft in the cover.

BRIEF DESCRIPTION OF THE DRAWINGS

FIG. 1 shows a cross-section of the cover and terminal before assembly.

FIG. 2 shows the cover and gasketed terminal in position for hot upsetting.

FIG. 3 shows a cross-section of the finished assembly.

Referring now to FIG. 1, molded cover 10 has at least one hole 11 with a counterbore 12 adjacent the top surface and a counterbore adjacent the bottom surface of the cover to form a seat 13. A terminal 15 has an enlarged end 16 and a grooved or serrated shank 17 over which is placed a gasket 18 which fits against the enlarged end portion 16. The gasket is of equal to or slightly larger diameter than the enlarged end portion 16 and fits the seat 13. Knife edge 21 provides a good sealing surface for the cover gasket when a capacitor can is sealed against it by known means.

FIG. 2 shows the cover and terminal in the resistance heater for hot upsetting. Gasket 18 surrounds enlarged end 16 of the terminal in place in cover 10 which rests on stop 32. Stop 32 serves to ensure that the end of the terminal is spaced above the surface of the cover 10 and to prevent plastic flash from obscuring said end. Stop 32 rests on collar 33 fastened by pins 34 to outer collar 36 thus allowing vertical movement only. There is a spring 35 surrounding electrode 37. Collar 36 is held fixed with respect to electrode 37 by set screw 38. As the upper, moveable electrode 31 moves downwardly it forces the enlarged end 16 of the terminal against gasket 18 compressing it and also forcing cover 10 against stop 32. Downward movement of stop 32 and collar 33 is resisted by spring 35. Current is passed through the terminal in contact with the upper moveable electrode 31 and lower fixed electrode 37 and held under pressure by electrodes 31 and 37 and spring 35 causing the mid-portion of the terminal to swell, melting plastic that flows along the line of least resistance and fills counterbore 12. The upper electrode 31 is retracted and the bonded terminal-cover assembly is removed. For simplicity's sake, the upsetting involving only one terminal is shown.

Referring now to FIG. 3, gasket 18 has been compressed against seat 13 and the terminal 17 has been hot upset causing it to swell at the midportion 19 of the shank and for plastic, locally heated by the hot upset operation, to flow around the terminal and fill in the upper counterbore 12 thus ensuring a leak-free fit between cover and terminal when solidified. Enlarged end 16 provides the surface for attachment of an electrode tab (not shown), while an external lead can be attached to the opposite end 20 of the terminal.

DESCRIPTION OF THE PREFERRED EMBODIMENTS

A molded polyphenylene sulfide cover has at least one hole therein for a feed-through metal terminal, preferably of aluminum. This thermoplastic is desirable not only because of its compatability with electrolytes and rigidity which results in low weight loss on temperature cycling, but also because of the toughness and high softening point of polyphenylene sulfide compared to prior art cover materials, e.g., polyethylene, polypropylene, or polyamides. The hole in the cover is counterbored at one end to provide space for cover material heated and flowed during a hot upsetting operation so that it will not extrude above the end of the terminal and interfere with subsequent welding operations. Dimethylformamide, a preferred capacitor electrolyte solvent, tends to creep. In order to prevent its seepage around the end of the terminal and along the shaft, the lower end of the hole terminates in a counterbore which receives a gasket of equal or greater outside diameter than the enlarged end portion of the terminal. The gasket material must withstand both the operating temperatues (125° C. or above) and those of the upsetting operation plus being compressible and inert to the electrolyte solvent used in the final capacitor. The preferred elastomeric materials include butyl rubber, ethylene-propylene elastomers, and ethylene-propylene terpolymers. When the gasketed terminal is in place, the unit is placed in a device capable of passing current, i.e., a resistance welder. An axial compressive force is applied on the terminal during the heating stage when an electric current is passed through the terminal which causes the terminal shank to soften and swell in its mid-portion and locally heat and melt adjacent cover material which flows around the terminal and fills the smaller counterbore. The solidification of the material provides an electrolyte barrier and holds the terminal firmly in place ready for subsequent assembly into a finished capacitor.

The molded cover has a rim portion for seating into a crimped capacitor can, and the top surface of the rim portion bears a raised circumferential wedge spaced inwardly from the edge of the cover for engagement with a gasket used to seal the final capacitor by known means.

What is claimed is:

1. A process for making a terminal-cover assembly for an electrolytic capacitor comprising placing a solvent-resistant gasket adjacent an enlarged end portion of a terminal, placing the resultant assembly in a hole through a molded polyphenylene sulfide cover, said hole terminating in a larger counterbore at one end and a smaller, shallower one at the other end, said gasket being received by said larger counterbore and both ends of said terminal extending beyond the surfaces of said cover, and then subjecting said terminal to resistance heating under pressure whereby the mid-portion of the terminal, which is serrated, is swelled against the cover and plastic locally heated and compressed by this operation flows and substantially fills in said smaller counterbore.

2. A process according to claim 1 wherein said gasket is composed of an ethylene-propylene elastomer.

3. A process according to claim 1 wherein said gasket is composed of butyl rubber.

4. An electrolytic capacitor cover-terminal assembly comprising a molded polyphenylene sulfide cover containing at least one gasketed terminal, said terminal having an enlarged end portion and a serrated shank which extends through and beyond said cover, said gasket being adjacent said enlarged end portion and of equal to or larger outer diameter than said end portion and seated in a recess in said cover, and said terminal being thermally and compressively bonded to said cover.

5. A cover-terminal assembly according to claim 4 wherein said gasket is a solvent-resistant ethylene-propylene elastomer.

6. A cover-terminal assembly according to claim 4 wherein said gasket is composed of butyl rubber.

7. A cover-terminal assembly according to claim 4 wherein in its unflowed state the end of the hole opposite said gasketed end has a counterbore and in its bonded condition cover material has flowed to substantially fill said counterbore.

* * * * *